INVENTORS
JOSEPH J. CIMEROL
WILLIAM M. CLARKE
WILLIAM I. DENTON
BY
ATTORNEY

United States Patent Office 3,356,728
Patented Dec. 5, 1967

3,356,728
PROCESS OF PREPARING AROMATIC POLY-
AMINES BY CATALYTIC HYDROGENATION
OF AROMATIC POLYNITRO COMPOUNDS
Joseph J. Cimerol, Hamden, William M. Clarke, North
Haven, and William I. Denton, Cheshire, Conn., assignors to Olin Mathieson Chemical Corporation, a corporation of Virginia
Filed Mar. 12, 1964, Ser. No. 351,398
11 Claims. (Cl. 260—580)

ABSTRACT OF THE DISCLOSURE

Aromatic polyamine compounds are prepared by continuously adding hydrogen and an aromatic polynitro compound to a reaction zone containing nickel while simultaneously maintaining the following conditions:
(a) the reaction zone is saturated with hydrogen,
(b) the aromatic polynitro compound is fed to the liquid phase at a rate equivalent to a catalyst loading of no more than about 0.15 pound-equivalents of nitro groups per hour per pound of catalyst in the reaction zone,
(c) the concentration of said aromatic polynitro compound in the reaction zone is below about 0.1 percent by weight.

---

This invention relates to an improved catalytic hydrogenation of aromatic polynitro compounds. More particularly, this invention relates to an improved process for the use of nickel catalysts such as Raney nickel catalysts in the liquid phase reduction of aromatic polynitro compounds to the corresponding aromatic polyamine compounds.

Numerous processes have been developed for the catalytic reduction or hydrogenation of aromatic polynitro compounds. However, a number of problems have been encountered in attempting to effect the catalytic hydrogenation of dinitro or higher polynitro aromatic compounds to the corresponding aromatic diamines or higher polyamines. In particular, the di- and tri-nitro compounds are extremely hazardous at higher temperatures and can readily cause explosions. For example, trinitrotoluene decomposes in the range of 130–140° C. Dinitrotoluene is similarly sensitive at a slightly higher temperature. In order to overcome this potential hazard, it is essential to keep the temperature below this range. In the case of the hydrogenation of dinitrotoluene, this can be accomplished by the use of noble metal catalysts such as platinum. The high cost of these catalysts makes it essential to minimize the amount used, or to hydrogenate large quantities of the dinitro compound before the catalyst is poisoned. However, when low concentrations of these catalysts are used, long holdup times (10–20 hours) are necessary.

Nickel catalysts have also been used in both batch and continuous operations, using high pressures (800–2000 p.s.i.g.) to keep the temperatures down to a safe level while achieving the desired conversions. However, when fixed bed catalyst systems are employed, there is a rapid decrease in the effectiveness of Raney nickel catalyst which is poisoned by the aromatic polynitro compound reactant and by its reducible contaminants. In processes in which the reaction is carried out by agitating a heated slurry of catalyst, nitro compound and reaction products, removing the slurry from the reactor and then separating the catalyst by filtration or other solid-liquid technique and returning it to another reaction batch, there is also further poisoning of the catalyst after removal from the liquid, and a large amount of make-up catalyst must be added. Because of the large consumption of catalyst under these conditions, the nickel catalyst cost is high, thus eliminating any advantage over noble metal catalysts.

There is a need in the industry at the present time for an improved process for the preparation of aromatic polyamine compounds from polynitro compounds.

It is a primary object of the invention to provide an improved process for the catalytic hydrogenation of aromatic polynitro compounds.

It is another object of this invention to provide a process for increasing the effective life of the catalyst employed in the hydrogenation of aromatic polynitro compounds.

Still another object of the invention is to provide an improved technique for separating catalyst from the reaction product obtained by the hydrogenation of aromatic polynitro compounds.

It is another object of the invention to provide a novel reactor apparatus for effecting the hydrogenation of aromatic polynitro compounds.

A further object of the invention is to provide an improved process for reducing dinitrotoluene to toluene diamine in the presence of Raney nickel catalyst.

These and other objects of the invention will be apparent from the following detailed description thereof.

A novel continuous process has now been discovered for the catalytic hydrogenation of aromatic polynitro compounds, and a novel reactor apparatus has been discovered in which the foregoing objects are accomplished. Briefly, in this novel process, the aromatic polynitro compound is slowly fed to the reaction zone of a reactor containing an agitated slurry of catalyst in a solvent for the reaction product. Sufficient catalyst is present in the reactor to provide a solids content in the slurry of between about 2 and about 25 percent by weight of the slurry. The aromatic polynitro compound is fed to the reactor at a rate sufficient to provide a catalyst loading of less than about 0.15 pound equivalents of nitro groups in the aromatic nitro compound fed to the reactor per hour per pound of catalyst. During the reaction the catalyst slurry and the reactor contents are maintained continuously saturated with hydrogen. The catalyst slurry, which contains the aromatic polyamine reaction product, is continuously withdrawn from the reactor through a filter medium in contact with the slurry, thereby permitting removal of the crude liquid reaction product from the reactor while retaining the catalyst within the reaction zone. The crude liquid reaction product may be further purified or the crude aromatic polyamine product may be stored for use, as described more fully below.

The term "catalyst loading" as employed throughout the description and claims is defined as the pound equivalents of nitro groups in the feed to the reactor per hour per pound of catalyst in the reactor.

The prior art refers to "low concentrations" of nitro compounds in the reactor, but generally a concentration between 2 and 10 percent by weight of the nitro compounds in the reactor is employed. In marked contrast, in this invention, the concentration of nitro compounds in the reactor is maintained below 0.1 percent and preferably below about 0.015 percent by weight. In addition, the prior art employs the term "high catalyst concentration" in processes for the reduction of aromatic nitro compounds, but this term is used generally to define a catalyst concentration up to about 2 percent by weight of the aromatic nitro compound, which is equivalent to a weight ratio of about 0.02:1. In marked contrast, under the catalyst loading conditions of this invention, the weight ratio of catalyst to unreduced nitro compounds in the reactor is generally of the order of 1200:1 to 1500:1 or higher. Thus it can be seen that, in the process of this invention, a much lower concentration of nitro compounds and a much higher concentration of catalyst is maintained in the reactor than has been utilized heretofore. As a result of the improved technique of this invention there is a marked increase in the life of the catalyst, as well as higher product yields, improved product purity, and a substantial reduction in the cost of preparing each unit of the aromatic polyamine product. Reducing the product cost by increasing the catalyst concentration is surprising and unexpected in view of the present efforts in the industry to lower costs by lowering catalyst conecentration.

Figure 1:
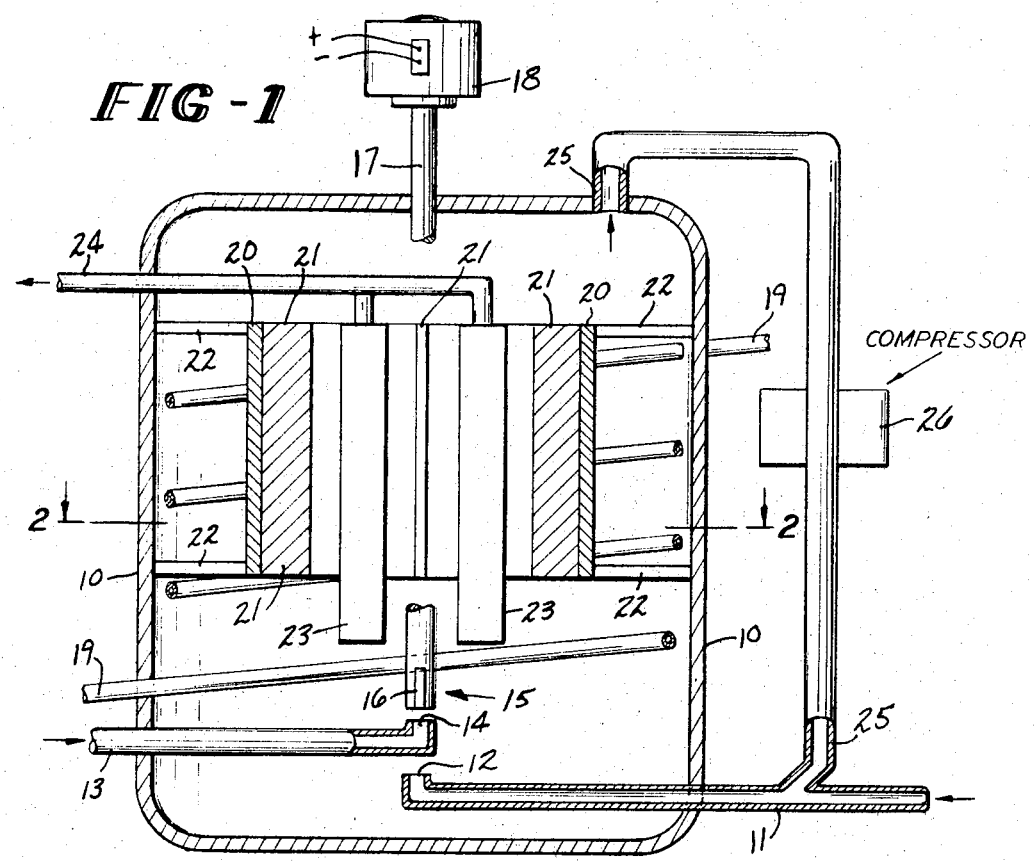
FIGURE 1 is an elevational view of the novel apparatus in which the process of this invention can be effected.

Referring to FIGURE 1 there is shown a reaction vessel 10 which may be constructed of steel, stainless steel, or other suitable material of construction capable of withstanding the temperature and pressure conditions employed without rupturing and without being adversely corroded. At a point adjacent to the bottom of the reaction vessel 10 a hydrogen feed line 11 passes from a hydrogen source under pressure (not shown) through the reaction vessel 10 and is secured to a hydrogen inlet 12 positioned to effect maximum distribution of gaseous hydrogen throughout the reaction vessel 10. It will be recognized by one skilled in the art that the hydrogen may be distributed in any convenient manner to achieve this distribution.

Aromatic polynitro compound feed line 13 passes through the wall of reaction vessel 10 at a position near the bottom of the vessel and is secured to aromatic polynitro compound inlet 14. It is preferred that the aromatic polynitro compound inlet 14 be positioned to permit feeding of the aromatic polynitro compound at a point approximately in the center of reaction vessel 10 in order to obtain substantially uniform contact with the hydrogen gas escaping from hydrogen inlet 12. However, the aromatic polynitro compound inlet 14 can be positioned at any convenient point in reaction vessel 10. Positioned above the aromatic polynitro compound inlet 14 is a mechanically driven agitator 15 having at least one set of blades 16 which are connected to agitator shaft 17. Agitator shaft 17 is connected to agitator motor 18, which is powered by electricity (not shown) or other convenient power supply. If desired, agitation within reaction vessel 10 can be obtained by replacing or supplementing mechanically driven agitator 15, which is generally positioned along the central vertical axis of reaction vessel 10, with one or more, and preferably at least four, side entering mechanically driven agitators (not shown) spaced equidistant around the periphery of reaction vessel 10.

A temperature control coil 19 enters the wall of reaction vessel 10 at a point near the bottom of the vessel, and follows a helical path adjacent to the inner vertical wall of reaction vessel 10, and then passes through the wall at a point adjacent to the upper portion of vessel 10. Any suitable temperature control fluid such as water or steam may be passed through temperature control coil 19 in order to maintain the reaction mass within the desired temperature range. Control of the reaction temperature is obtained by passing fluid of a suitable temperature to increase or decrease the reaction temperature as desired. To cool the reaction mass, a cooling fluid having a temperature substantially below that of the reaction mass is passed through the coil to lower the temperature of the reaction mass to the desired temperature. To heat the reaction mass, a heating fluid having a temperature substantially above the temperature of the reaction mass is passed through the coil until the temperature is raised to the desired level. While only one coil has been illustrated, it is possible to employ two or more coils, preferably helically shaped, in order to obtain the desired control of temperature as the reaction progresses.

In addition, external jackets (not shown) may also be employed to control the reaction temperature.

A baffle support ring 20 is positioned with its center along the vertical axis of reaction vessel 10. The ring is preferably positioned between the temperature control coil and the central vertical axis of reaction vessel 10, but any convenient position may be employed. Secured vertically within the baffle support ring are at least two or more vertical baffles 21 positioned substantially equidistant around the inner circumference of baffle support ring 20. If desired, the vertical baffles 21 may be positioned equidistant around the outer circumference of ring 20, or may be attached to the wall of vessel 10. Baffle support ring 20 is secured to the inner wall of reaction vessel 10 by means of suitable ring supports 22 or any other convenient securing means.

Positioned along the inner periphery of baffle support ring 20 is at least one internal filter element 23 and preferably four or more internal filter elements positioned vertically. When two or more internal filter elements 23 are employed, they are preferably placed equidistant around the inner circumference of baffle support ring 20. Each internal filter element 23 is preferably constructed of sintered porous stainless steel, having an average pore opening in the range of between about 1 and about 20 microns, and preferably between about 2 and about 5 microns. If desired, internal filter element 23 may be constructed of stainless steel cloth or screen or any other type of suitable cloth or screen having the desired particle size opening. Other types of filter media suitable for use as internal filter 23 include porous plastic or ceramic bayonet filters, and non-woven synthetic fiber covered leaf filter elements. Obviously, the size of the pore opening or screen opening should be smaller than the particle size of the catalyst to retain the catalyst in the reactor. Any convenient solid-liquid separation technique may be employed in which the catalyst is retained in the reaction zone while the liquid polyamine reaction product is withdrawn. Internal filter elements 23 are connected to aromatic polyamine product discharge line 24, which passes through the wall of reaction vessel 10 at a position at the top of the vessel. Sufficient pressure drop is maintained across the filter to permit withdrawal of the aromatic polyamine product from the reaction vessel 10 through internal filter elements 23 into product discharge line 24. Product discharge line 24 conveys the liquid product to a suitable filtrate collector (not shown). The liquid polyamine reaction product may be then conveyed to storage or to any suitable processing step.

At a point near the top of reaction vessel 10 is excess hydrogen discharge outlet 25 which communicates with a suitable blower 26 or other suitable pressure increasing means. Applying pressure in this manner causes excess hydrogen to pass from the top of reaction vessel 10 through excess hydrogen discharge outlet 25 through blower 26 to hydrogen feed line 11, where excess hydrogen is admixed and recycled with fresh hydrogen. The resulting mixture is fed to the reactor vessel 10 through line 11 to hydrogen inlet 12 and into the reaction mass.

Figure 2:
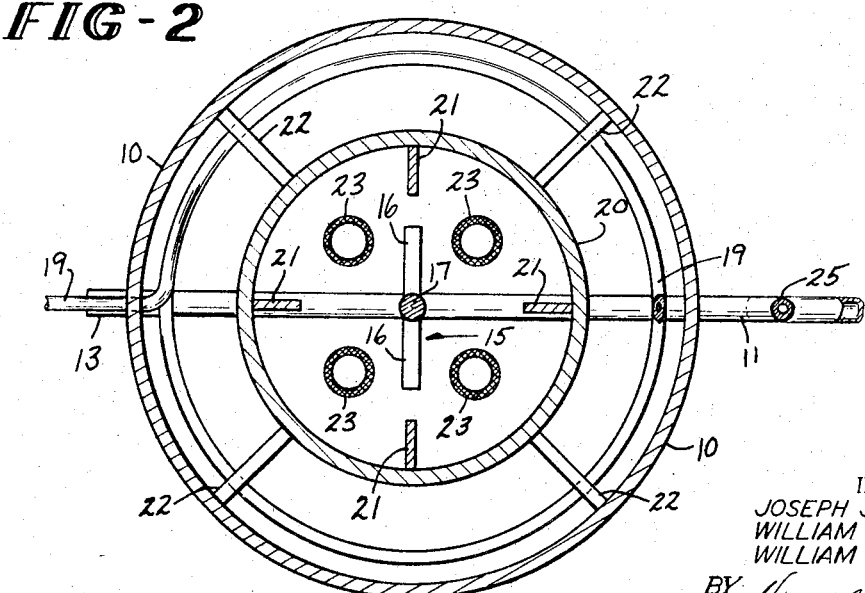
FIGURE 2 is a plan view of the novel reactor through the lines 2—2 of FIGURE 1.

FIGURE 2 is a plan view of the novel reactor as seen through a horizontal plane perpendicular to the vertical axis of the reaction vessel 10 through line 2—2 of FIGURE 1. FIGURE 2 shows reaction vessel 10 having hydrogen feed line 11 entering near the bottom of the vertical wall of the vessel to an area below agitator shaft 17 and aromatic polynitro compound feed line 13, which tenters near the bottom of reaction vessel 10 and ends underneath agitator 15.

Temperature control coil 19 is a helical coil positioned between the hydrogen inlet 12 and the wall of reaction vessel 10. Baffle support ring 20, having vertical baffles 21 secured thereto, is secured by means of ring supports 22 to the side wall of cylindrical reaction vessel 10. Internal filter elements 23 are positioned vertically and equidistant between the baffles 21. Excess hydrogen is fed to hydrogen feed line 11 by means of excess hydrogen discharge outlet 25.

In more detail, the novel process of this invention will be described, as carried out in the novel apparatus illustrated in FIGURES 1 and 2. However, it will be recognized by one skilled in the art that various modifications in the apparatus may be employed, some of which are described herein, without departing from the invention of the novel process.

At startup, the reactor is charged with a slurry of catalyst particles. The catalyst is preferably finely divided Raney nickel, but the novel process of this invention can also be carried out with other nickel catalysts such as powdered or pelleted nickel catalyst using kieselguhr, alumina, silica-alumina, carbon, etc. as supports. The particle size of the catalyst is preferably in the range betwen about 2 and about 200 microns, but larger or smaller size particles can be employed. As indicated previously, the average particle size of the catalyst must be larger than the size of the pore openings of the filter medium employed in order that the catalyst will be retained in the reaction zone.

The liquid component of the slurry catalyst in the reactor at startup may be any suitable inert solvent for the aromatic polynitro compound. Typical examples of suitable inert solvents for the nitro-substituted aromatic products include methanol, ethyl acetate, 2-ethoxy-ethanol-1, dimethylformamide, butyl acetate, dibutyl phthalate, glycol ethers such as ethylene glycol dimethyl ether, mixtures thereof, and the like. If desired, an aromatic polyamine corresponding to the aromatic polynitro compound reactant may be employed as a solvent, but generally better results are obtained when another inert solvent is employed.

The proportion of catalyst should be between about 2 and about 25 and preferably between about 5 and about 10 percent by weight of the slurry.

Hydrogen is pumped into the slurry under pressure until the desired pressure is obtained in the reactor and the catalyst slurry is then heated to a temperature within the operating temperature range.

The catalyst slurry temperature at startup is maintained in a range between about 85° and about 120° C., but after the reaction begins the temperature may be increased up to about 150° C. It is preferred to employ a startup temperature between about 100° and about 120° C., and a reaction temperature of between about 120° and about 140° C. Higher temperatures may be employed, but higher pressures may also be necessary in order to prevent volatilization of the solvent or other components of the reaction mass.

Sufficient hydrogen is fed to the reactor through hydrogen inlet 12 to provide at least the stoichiometric proportion required to reduce the aromatic polynitro compound subsequently fed to the reactor to yield the corresponding aromatic polyamine compound, and also sufficient hydrogen to saturate the reactor contents with hydrogen, including the surfaces of the particles of catalysts, while maintaining a pressure in the reactor in the range between about 100 and about 2000 p.s.i.g., and preferably in the range between about 200 and about 500 p.s.i.g. Pressures higher than 2000 p.s.i.g. may be employed, if desired. Excess hydrogen in the reactor is continuously withdrawn, as the reaction progresses, through excess hydrogen discharge outlet 25 at the top of reactor 10 and is returned by means of blower 26 to the reactor through hydrogen inlet 12 with make-up hydrogen.

Sufficient agitation is provided by agitator blade 16 in the reaction zone to maintain a substantially uniform suspension of the catalyst particles in the liquid phase in the reactor, and to disperse the hydrogen bubbles throughout the slurry.

After startup conditions are obtained, as described above, a solution of the aromatic polynitro compound reactant is slowly fed to the reactor through the aromatic polynitro compound feed line 13 and inlet 14. Typical examples of suitable aromatic polynitro compounds which may be reduced in accordance with the technique of this invention include dinitrotoluene, trinitrotoluene, dinitrobenzene, tetranitrodiphenylethane, nitro-substituted xylenes, hydroxy-substituted aromatic polynitro compounds such as dinitro cresol, mixtures thereof and the like. The efficient catalyst utilization, high product purity and improved yield attained by the process of this invention may also be extended to other nitro compounds, such as nitrobenzene trifluoride, p,p'-bis(nitrophenyl) methane and the like, but generally the process of this invention is more effective when dinitro- and trinitro-substituted aromatic compounds are employed as a reactant.

Since many of the aromatic polynitro compounds are solid at ambient temperatures, it is preferred to dissolve the aromatic polynitro compound in a suitable inert solvent of the type described above in a proportion equivalent to between about 10 and about 50, and preferably between about 15 and about 35 percent by weight of the resulting solution prior to feeding it to the reactor. It is possible to melt the aromatic polynitro compound and feed the resulting molten material to the reactor through aromatic polynitro compound feed line 13. However, because of the close temperature control necessary in order to maintain the aromatic polynitro compound in a liquid form, it is preferred to employ a solvent as described more fully below.

The aromatic polynitro compound in solution is fed continuously to the reaction zone through aromatic polynitro compound feed line 13 and inlet 14 at a rate equivalent to a catalyst loading of less than about 0.15 pound-equivalents, and preferably between about 0.01 and about 0.11 pound-equivalents of nitro groups per hour per pound of catalyst in the reactor. Because of the relatively low feed rate of the aromatic polynitro compound to a reactor containing a substantially higher concentration of catalyst than is normally employed, there is substantially instantaneous hydrogenation of the aromatic polynitro compound as it enters the reactor 10. As a result there is usually less than 0.005 percent by weight of unreduced nitro compounds in the liquid phase of the reactor at any time, which thereby prevents the rapid poisoning and deterioration of the catalyst that is normally encountered in conventional hydrogenation reactions of this type. In addition, higher yields and improved purity of product at a substantial reduction in cost is obtained.

As the reaction progresses, a portion of the liquid phase is withdrawn through internal filter element 23 at a rate substantially equal to the liquid feed rate of the aromatic polynitro compound to the reactor. The liquid phase in reactor 10 predominates in the aromatic polyamine compound produced by the hydrogenation reaction along with water, solvent, and impurities that may be present in the system. As the liquid phase passes through internal filter element 23, the solid particles of catalyst are retained in the reactor by the filter element and a clarified liquid phase is withdrawn from the reactor through aromatic polyamine compound product discharge line 24.

Agitation of the slurry in the reactor 10 during the reaction must be sufficient to not only maintain a uniform suspension of the catalyst in the slurry phase, but must also be sufficient to wash away the catalyst filter cake from each internal filter element 23 as it forms, and redisperse it in the slurry phase. The catalyst is generally washed off the internal filter element 23 by keeping the slurry velocity across the face of internal filter element 23 in excess of twice the liquid velocity through internal filter element 23.

The clarified liquid phase thus recovered is then distilled to remove any solvent that may be present, and the solvent is recycled for dissolving additional aromatic polynitro compound. The residue of aromatic polyamine compound and water is then heated to evaporate water and to remove impurities, which are disposed of by conventional methods. The aromatic polyamine product is then collected and stored for use as desired.

An important advantage of the novel process of this invention is that no problems are caused by the water formed during the reaction. In the absence of aromatic polynitro compounds, the water is soluble in the solvent-polyamine reaction product, thus eliminating the difficulties of multi-phase systems required in prior art techniques.

When the reactor contents are kept saturated with hydrogen at all times and when the feed rate of the aromatic polynitro compound to the reaction zone is maintained within the above mentioned ranges, it is possible to obtain substantially instantaneous and complete reduction of the aromatic polynitro compound to the corresponding aromatic polyamine compound. As a result of this improved technique, the catalyst life is markedly improved, thereby substantially reducing the cost of producing the aromatic polyamine compound. Failure to maintain the conditions described above results in premature loss of activity by the catalyst and reduced product yields. In addition, when dinitrotoluene or trinitrotoluene is employed as the aromatic polynitro compound, the explosion hazard is virtually eliminated, since the concentration of dinitrotoluene or trinitrotoluene in the reactor at any given time is extremely small.

As the catalyst loading is increased or as the catalyst becomes spent (i.e. begins to lose its reducing activity) side reactions which form undesired resnious products are accelerated. These undesired by-products reduce the yield and also reduce catalyst life by coating or poisoning the active centers on the catalyst. However, as described herein, the use of the proper combination of operating variables to give maximum catalyst life also minimizes these undesired side reactions resulting in a product of substantially higher quality and better yields than are obtained using previously known procedures.

One important feature of this invention is that the catalyst must be maintained in contact with hydrogen at all times when in the presence of trace quantities of aromatic polynitro compounds in order to prevent it from becoming poisoned. In continuous liquid phase reduction processes, maintaining the catalyst in the presence of hydrogen during the separation is extremely difficult to accomplish without the loss of catalyst life, since the absence of dissolved hydrogen in the liquid phase even for an instant, is sufficient to poison the catalyst in the presence of aromatic polynitro compounds.

Continuous processes using external filters with catalyst recycle, continuous centrifuges, continuous centrifuges plus magnetic separators, and catalyst settlers to carry out reduction of aromatic nitro compounds have all been investigated. However, a marked reduction in catalyst consumption, and an increase in product quality and yield have been obtained using internal filters in the reactor to continuously separate the product in accordance with the technique of this invention, while maintaining the catalyst in an active state in the reactor saturated with hydrogen.

The following examples which illustrate the preferred embodiment of this invention are presented without any intention of being limited thereby. All parts and percentages are by weight unless otherwise specified.

EXAMPLE I

A methanol solution of technical grade dinitrotoluene (approximately 80 percent by weight of 2,4-dinitrotoluene and about 20 percent by weight of 2,6-dinitrotoluene) was prepared by dissolving dinitrotoluene in methanol at 50° C. to give a final solution of 25.8 percent by weight of dinitrotoluene.

The reactor employed for the reaction was a one gallon autoclave equipped with internal cooling coils and external heating to adjust the temperature as desired. The reactor was also provided with a mechanical agitator having a speed of 1000 revolutions per minute, the agitator shaft having secured thereto a turbine agitator with a diameter equal to ⅓ the reactor diameter and positioned along the shaft at a distance equivalent to about ½ the reactor diameter above the reactor bottom. Feed lines for the dinitrotoluene and hydrogen were through dip tubes positioned within the autoclave to discharge directly into the eye of the turbine. A single porous stainless steel filter element having average pore openings of about 5 microns in diameter was secured within the autoclave to permit separation of the product effluent from the 0.72 pound of No. 28 Raney nickel catalyst charged to the autoclave. At startup the reactor was filled with a slurry of the catalyst in methanol. The reactor was pressurized to 400 p.s.i.g with hydrogen, heated to a temperature of 115° C., and agitated. These temperature, pressure and agitation conditions were maintained throughout the reaction.

The above described methanol solution of dinitrotoluene was then fed to the reactor through a heated line designed to keep the feed at 50° C. in the line. The rate of feed of the methanol solution of dinitrotoluene was 26 pounds per hour and the simultaneous feed rate of hydrogen was at the rate of about 0.44 pound per hour. During the reaction unreacted hydrogen was withdrawn from the reactor. Product was withdrawn from the autoclave at the rate of 26.4 pounds per hour. After equilibrium was obtained, the average product analysis obtained during the reaction was 16.2 percent toluene diamine, 1.1 percent residues, 0.05 percent dinitrotoluene, 72.95 percent methanol and 9.7 percent water. The reaction continued for about 37 hours during which time the conversion exceeded 99.9 percent. At the end of this period, the effectiveness of the Raney nickel catalyst decreased and the run was stopped. A comparison of this example with the results of a similar run (Comparative Test A) employing six times the catalyst loading (the same feed rate with 0.12 pound nickel in the reactor) is shown below:

| Example | Catalyst Loading [1] | Duration of Run, hr. | Catalyst Life lb. DNT/ lb. Cat. | Product Quality, Percent [2] | | |
|---|---|---|---|---|---|---|
| | | | | Reducibles | Amine | Residue |
| I | 0.102 | 37.0 | 350 | 0.12 | 95.5 | 3.3 |
| Comparative Test A | 0.612 | 0.9 | 45 | 0.36 | 92.5 | 0.9 |

[1] Pound-equivalents of NO₂ per hour per pound of catalyst.
[2] After removal of solvent and water.

The above comparison illustrates that by modifying the reaction conditions as described in the invention, not only is catalyst life increased by more than seven fold, but also yield is increased by at least 3.0 percent and product quality is improved.

EXAMPLES II–III

In Example II, a procedure similar to that of Example I was employed with the exception that the feed rate was reduced from 26.0 pounds per hour to 4.3 pounds per hour, and the catalyst amount was decreased to 0.12 pound of nickel in the reactor, giving a catalyst loading of 0.101 pound-equivalents of nitro groups per hour per pound of catalyst. In Example III, a procedure similar to Example II was employed with exception that the catalyst was increased to 0.42 pound nickel in the reactor, resulting in a catalyst loading of 0.029.

librium was quickly attained, and the average analysis of the product obtained during the reaction was 16.0 percent toluene diamine, 0.5 percent residue, 0.015 percent reducibles, 73.8 percent methanol, and 9.7 percent water. The reaction continued for about 540 hours, during which time 3,000 pounds of dinitrotoluene of 9,000 pounds of methanol were fed to the reactor. During this entire pe-

| Example | Catalyst Loading[1] | Feed Rate, lbs./hr. | Duration of Run, hr. | Catalyst in Reactor, lb. | Catalyst Life, lb. DNT/ lb. Cat. | Product Quality, Percent | | |
|---|---|---|---|---|---|---|---|---|
| | | | | | | Reducibles | Amine | Residue |
| Comparative Test A | 0.612 | 26 | 0.9 | 0.12 | 45 | .36 | 92.7 | 6.9 |
| II | 0.101 | 4.3 | 55 | 0.12 | 430 | .18 | 94.7 | 5.1 |
| III | 0.029 | 4.3 | 542 | 0.42 | 1,360 | .03 | 96.8 | 2.9 |

[1] Pound-equivalents of nitro groups per hour per pound of catalyst.

The examples illustrate that catalyst loading can also be varied by changing the feed rate as well as changing the amount of catalyst. When the results of Examples II and III are compared with those of Comparative Test A, it can be seen that lowering the feed rate increases the catalyst life by a factor of almost 10 (Example II) and lowering the feed rate and increasing the catalyst amount (Example III), increases the catalyst life by a factor of about 34 times the life obtained in Comparative Test A. In addition the product purity is markedly improved in both Examples.

EXAMPLE IV

An alcohol solution of dinitrotoluene was prepared by agitating molten technical grade dinitrotoluene (approximately 80 percent 2,4- and 20 percent 2,6-dinitrotoluene) in methanol at a temperature of about 50° C. Three pounds of methanol were employed for each pound of molten dinitrotoluene.

The reactor employed for the reaction was a five gallon autoclave provided with internal and external coils to adjust the reaction temperature as desired. The reactor was also provided with a mechanical agitator having a speed of 600 revolutions per minute. Secured to the agitator shaft was a four inch diameter turbine type agitator and a four inch diameter propeller type agitator, the turbine being positioned about ⅓ of a reactor diameter up from the reactor bottom and the propeller being positioned about one reactor diameter up from the reactor bottom along the shaft. Feed lines for the dinitrotoluene and hydrogen were secured to dip tubes positioned within the autoclave to discharge directly into the eye of the four inch turbine to insure immediate mixing of both the dinitrotoluene and the hydrogen with the reactor contents. Six porous stainless steel filter elements were secured within the autoclave to permit separation of the product effluent from the particles of No. 28 Raney nickel catalyst charged to the autoclave. At startup, the reactor was filled with methanol containing 2.21 pounds of the catalyst.

The slurry of methanol and Raney nickel catalyst was pressurized to 400 p.s.i.g. with hydrogen, agitated, and heated to a temperature of 120° C. These temperature, pressure and agitation conditions were maintained through the reaction. The alcohol solution of dinitrotoluene was then fed to the reactor through a steam traced line to maintain the solution at about 50° C. in the line. The rate of feed of the alcohol solution of dinitrotoluene was about 22.1 pounds per hour, which was equivalent to a catalyst loading of 0.028 pound-equivalents of nitro groups per hour per pound of catalyst, and the simultaneous feed rate of hydrogen was at the rate of about 0.36 pound per hour. Product was withdrawn from the autoclave at the rate of about 22.5 pounds per hour. Equiriod the conversion in the reactor never fell below 99.93 percent. At the end of this period the effectiveness of the Raney nickel catalyst decreased, and it was replaced with fresh catalyst. After separating the methanol and water, the stripped product contained 96.8 percent amine equivalents, 3.2 percent residue and only 0.03 percent reducibles.

EXAMPLE V

A procedure similar to Example IV, employing the apparatus of Example IV, was used in the reduction of trinitrotoluene to triaminotoluene in accordance with the technique of this invention. A solution of trinitrotoluene in ethyl acetate was prepared by agitating the ingredients in the weight ratio of 131 parts of trinitrotoluene to 869 parts of ethyl acetate at a temperature of between about 55° and about 60° C. until a substantially homogenous solution was obtained. The reactor was filled with 2.21 pounds of Raney nickel catalyst and ethyl acetate. At startup, agitation was started and the resulting slurry of ethyl acetate and Raney nickel catalyst was heated to a temperature of about 100° C. under a hydrogen pressure of about 400 p.s.i.g. The agitation, temperature, and pressure conditions were maintained throughout the reaction. The ethyl acetate solution of trinitrotoluene was fed to the reactor by a metering pump through a 60° C. warm-water jacketed line at the rate of about 41.9 pounds per hour, which was equivalent to a catalyst loading of 0.033 pound-equivalents of nitro groups per hour per pound of catalyst. At the same time about 0.5 pound per hour of hydrogen was fed to the reactor from hydrogen cylinders, and unreacted hydrogen was withdrawn from the top of the reactor. Product effluent was withdrawn from the reactor through the porous stainless steel filter elements at the rate of about 42.5 pounds per hour. The average analysis of the product stream during the 205 hours of operation was about 7.8 percent toluene triamine, about 86.0 percent ethyl acetate, and 6.2 percent water. During this period 1127 pounds of trinitrotoluene and 7476 pounds of ethyl acetate were fed to the reactor. The conversion in the reactor never fell below 99.95 percent during the reaction period.

EXAMPLES VI–VIII

An alcohol solution of ninitrotoluene was prepared as in Example I. The reactor employed was the one described in Example I. The initial charge to the reactor consisted of 0.12 pound of catalyst and 4.3 pounds of methanol. The reactor was agitated, pressurized to desired pressure with hydrogen and heated to 115° C. These temperature, pressure and agitation conditions were maintained throughout each of three runs; the first at 100 p.s.i.g., the second at 200 p.s.i.g., and the third at 400 p.s.i.g. Operating techniques were essentially the same as described for Example I, cf. A summary of the operating conditions and results are shown below:

| Example | Press., p.s.i.g. | Catalyst Life, Lb. DNT/lb. cat. | Product Quality, wt. percent | | | Duration of Run, hr. |
|---|---|---|---|---|---|---|
| | | | Reducibles | Amine | Residue | |
| VI | 100 | 150 | 0.20 | 94.3 | 5.5 | 92 |
| VII | 200 | 350 | 0.19 | 94.5 | 5.3 | 132 |
| VIII | 400 | 409 | 0.18 | 95.0 | 4.8 | 164 |

Feed rate=4 lb. DNT solution per hour.
Catalyst loading=0.10 lb. equivalents of $NO_2$/hr. per lb. catalyst.
Residence time=68 minutes.

EXAMPLE IX

Employing the apparatus of Example III, except that a woven stainless steel screen was employed as the filter medium, the procedure of Example III was modified by substituting dried toluene diamine product for the methanol solvent. A solution of technical 80/20 dinitrotoluene in toluene diamine was prepared at 50° C. using five pounds of dry toluene diamine for each pound of dinitrotoluene. At startup the reactor was filled with 1.1 pounds of Raney nickel catalyst and dried toluene diamine product, pressured to 600 p.s.i.g. with hydrogen, agitated, and heated to a temperature of 120° C. The amine-dinitrotoluene solution was fed at about 16.8 pounds per hour along with excess hydrogen. Product was continuously withdrawn from the reactor and the water continuously stripped off under vacuum in a falling film evaporator. The dried stripped product was then split into two portions, one portion being removed as product at a rate of about 1.9 pounds per hour and the balance returned to the process for preparing more DNT-TDA feed solution. The reaction continued for 750 hours during which time 2100 pounds of dinitrotoluene were fed to the reactor. During this period the conversion never fell below 99.96 percent and the stripped toluene diamine product contained 97.2 percent amine equivalents, 2.8 percent residue and only 0.02 percent reducibles. The catalyst was still active when the run was shut down.

EXAMPLE X

A 250 cc. stainless steel reactor equipped with agitation, cooling and an internal porous stainless steel filter was charged with 21.5 grams of Raney nickel catalyst and 220 cc. of methanol. It was then pressured to 400 p.s.i.g. with hydrogen with stirring and heated to 116° C. These conditions were maintained throughout the run. A 25 percent solution of meta nitrobenzotrifluoride was made up in methanol and fed to the reactor at a rate of 4 cc. per minute. This represents a catalyst loading of approximately 0.015 pound-equivalents of $NO_2$ per hour per pound of catalyst (2.7 pounds nitrobenzotrifluoride per hour per pound catalyst). After 10 days operation the reducibles content (nitro bodies) in the reactor effluent was still 0.003 weight percent or lower and the catalyst showed no reduction in activity.

EXAMPLE XI

Employing the apparatus of Example III, the procedure of Example III was modified by substituting 1.0 pound of a commercial supported nickel on kieselguhr catalyst for the Raney nickel catalyst. The feed rate was equivalent to a catalyst loading of 0.031. After 23 days operation the catalyst had reduced over 1545 pounds DNT and was still as active as when initially charged. Therefore, the run was voluntarily terminated. Product quality: TDA assay 96.5 percent, reducibles 0.22 percent, residue 3.3 percent.

As indicated above, one unique feature of this invention is the use of internal filters in the reactor containing the nickel catalyst in the reaction zone. In a given catalyst system, two factors contribute to the practicability of the catalyst. One is how long the catalyst can be used before its activity begins to decline and the second is the rate at which the catalyst is physically broken down into fine particles which cannot be recovered and returned to the system.

The foregoing examples have established operating conditions which maximize the length of time the catalyst can be used before its activity begins to fall off, resulting in unsatisfactory product. All of these preceding examples utilize internal filters in the reactor because other methods of recovering and recycling the catalyst are not practical in this system. In all other methods a number of problems prevent achieving a maximum performance goal.

First, the pyrophoric nature of the nickel catalyst makes it very hazardous to use in processes where the catalyst is filtered off and then returned separately to the reaction system. In contrast, the novel process of this invention retains the catalyst at all times under conditions that prevent the catalyst from igniting.

Second, if the nickel catalyst is removed from the presence of hydrogen for a very short time while still containing trace amounts of nitrobodies and catalyst poisons, its activity wil limmediately decline. Thus, maintaining hydrogen pressure on the catalyst at all times in accordance with this invention eliminates the excessive catalyst poisoning which occurs in many methods of recovering and recirculating the catalyst.

Third, as the catalyst is subjected to agitation, pumping and circulation, the average particle size is continuously being degraded. As a result catalyst fines are continuously formed. These fines are lost and not returned to the reaction system in many recovery schemes, but in the novel process of this invention they are retained in the reactor.

The fourth problem with recovering and reusing the nickel catalyst is that it does not follow the theoretical physical laws associated with these materials. For example, nickel has a very higth density and, as expected, settling tests run with fresh catalyst show that it is very simple to settle and effectively separate the nickel catalyst from solvents such as methanol. However, in actual practice, the settling rates are not proportional to particle size, nor are the rates the same as measured in the absence of hydrogen and reaction products. As will be described later, when settling tests were run on reaction products containing catalyst, the overflow contained just as high a concentration of large particles as the settled portion. It was also noted that the smaller particles appeared in the underflow or settled portion. Experimentation indicated that the low density of the large particles was due to absorbed hydrogen and hydrogen bubbles sticking to the particles. As a result, the large particles would not settle out. On the other hand, it was also noted that the smaller particles had a tendency to stick together, probably as a result of by-product residues acting as a binder. These agglomerates were lighter and also trapped hydrogen causing them to come out with the product. Those agglomerates which returned to the reactor were broken up and the fines went out with the product in the next pass through the separator. The net result was that no particles size separations could be obtained by settling or centrifugal techniques.

The following comparative tests describe some of the various catalyst reuse techniques:

Comparative Test B—External filters

In this test a methanol solution of dinitrotoluene (3:1 by weight) was fed to a reactor containing an agitated methanol slurry of No. 28 Raney nickel catalyst. A pressure of 400 p.s.i.g. was maintained with hydrogen and the temperature was maintained at 120° C. As the reaction progressed, a portion of the catalyst slurry was continuously withdrawn and filtered through an external filter. The recovered catalyst was then blended with fresh feed and again fed through the reactor system. The following two techniques were used:

(1) All the catalyst was reused until its activity began to decline.

(2) A 10 percent drag stream was removed from the catalyst filter cake and 10 percent fresh catalyst added to the remaining recovered catalyst, thus maintaining a constant amount of catalyst being circulated in the system.

When the catalyst was recirculated to extinction as in (1), relatively poor catalyst life was obtained. This was ascribed to the fact that it was almost impossible to avoid going through some period, however short, when the catalyst was starved for hydrogen in the presence of unreacted nitro compounds and catalyst poisons, resulting in a rapid decline in catalyst activity. In case (2) where 10 percent of the recovered catalyst was withdrawn and replaced with fresh catalyst, it was found that the majority of the catalyst circulating in the system was approaching the point at which its reduction activity began to decline (i.e. the average catalyst in the reactor was 90–95 percent spent). When this happened, while the catalyst still reduced the dinitrotoluene, secondary reactions took place which did not occur with fresh catalyst. This results in a considerable drop in ultimate yield. Details are shown in Table I.

Comparative Test C—Settlers

The process of Comparative Test B was employed except that settlers were employed to separate the solids from the catalyst slurry. The following two approaches were used:

(1) An internal settler.

(2) An external settler.

In designing these settlers, rates of sedimentation and settling were first determined for fresh catalyst in the presence of solvent and hydrogen. These rates were then used to size the settling zones. When initial experiments showed no separation, new settlers with five times the settling efficiency were designed. Results are shown in the summary table, but basically settling was not satisfactory because of (1) the carry-over of large particles due to hydrogen absorption and bubble formation and (2) the settling of small particles due to agglomeration with the by-product residue as a binder.

Comparative Test D—Centrifugal classifier

Another technique evaluated was the use of the centrifugal principle to separate catalyst. One system evaluated utilized a centrifugal classifier designed to return all +5 micron catalyst particles back to the reaction system in the underflow. All particles smaller than five microns would go out with the product in the overflow. The five micron separation point is the same as the five micron pore size used in most of the internal filters of the examples and, therefore, comparable results should have been achieved. In this unit the loss of catalyst was at the rate of 1 percent per minute for the first half hour. After 25–30 percent of the catalyst had been lost the amount carried overhead was considerably reduced, but still continued at a steady rate so that the net useful catalyst returned to the reactor fell to the point where its activity was rapidly destroyed. Microscopic analyses of the overflow product showed the same phenomena of large particle size in the overflow as was found in the settler products and the centrifugal classifier showed a physical breakup of the larger size catalyst particles, resulting in an increased number of less than 5 micron diameter size particles as the run progressed. Thus, even if the flotation effect did not occur and the settler and centrifugal classifier performed as designed, the newly created catalyst in the minus five micron range is lost in the product overflow from these units.

Comparative Test E—Settler+magnetic separator or filter

The final technique evaluated the use of a settler backed up by either a magnetic separator or a separate filter. Both of these techniques gave improved results over the results obtained with a settler alone. However, neither approached the efficiency of the internal filters of this invention.

EXAMPLES XIIa–XIId

In contrast to the results obtained in the foregoing Comparative Tests B–E, the newly created catalyst fines have no effect on catalyst consumption when using internal filters, because they are contained within the reaction zone. Normally under such circumstances it would be expected that, as the catalyst was degraded to finer and finer particles, these particles would either go through the internal filter or plug the internal filter. It has been found, when operating under the proper reaction conditions described above, that this does not occur. The reason is that a small amount of residue is formed in the reduction reaction. This residue acts as a binder for the catalyst which, in turn, builds up a precoat on the filter surface. The precoat in turn becomes smaller in pore size as the catalyst becomes smaller, thus ensuring that no fines get through to plug up the internal filters. As would be expected, the exact conditions which permit this result to be achieved vary with the initial particle size of the catalyst and with the pore size of the internal filters used. However, specific limitations can be established for a given set of operating conditions. For example, with Raney No. 28 catalyst using a 5 micron porous stainless steel internal filter, it was found that the amount of catalyst in the charge to the reactor should not exceed about 7–8 pounds of catalyst per sq. ft. of internal filter surface. When 10 pounds of catalyst per sq. ft. of filter surface was charged to the reactor, the filters plugged and required regeneration in ⅕ the time encountered when less than about 7–8 pounds of catalyst per sq. ft. of filter area was charged to the reactor. Improved filter effectiveness is obtained by starting out with low throughputs and increasing the rates over the first few days operation as the catalyst precoat is built up. Obviously, with different catalyst and different pore size filters different limitations would result. Typical results are also shown in Table I.

Thus it is evident that the use of the internal filter has the following advantages which cannot be achieved by any other separation technique.

(1) Catalyst fines formed by a mechanical degradation are contained within the reaction zone and continue to contribute to the reduction reaction.

(2) The catalyst is never starved for hydrogen and, therefore, does not lose activity under the proper operation conditions.

(3) No catalyst is lost due to inefficient separators.

(4) The catalyst starts out fresh and it is only as the catalyst approaches a spent condition that secondary reactions begin to be observed and ultimate yield decreases. At this point, with the internal filters system the catalyst is immediately replaced maintaining the high ultimate yields in contrast to the systems where the catalyst is continually approaching the spent state and the average ultimate yield is lower due to side reactions.

(5) The internal filter avoids the problems of variable settling rates due to variable hydrogen absorption on the

TABLE I

| Comparative Test or Example No. | Type of System | Length of Run, hours | Pounds of DNT Reduced per pound of Catalyst | Product Quality, Percent | |
|---|---|---|---|---|---|
| | | | | Reducibles | TDA* |
| B (1) | Continuous catalyst feed, external filter, all catalyst reused. | 50 (5 cycles) | 125 | 2–3 | 93 |
| (2) | 10% drag stream, 10% fresh catalyst | 90 (9 cycles) | 225 | 2–3 | 80 |
| C (1) | Internal Settler | 20 | 20 | 1 | 93 |
| (2) | External Settler | 240 | 320 | 0.5 | 93 |
| D | Centrifugal Classifier | 5 | | | |
| E | External Settler plus Magnetic Separator | 500 | 620 | 0.3 | 94 |
| XII (a) | Internal Filter (5-micron) | >800 | >2,500 | 0.05 | 97 |
| (b) | ....do.... | 600 | 1,500 | 0.05 | 97 |
| (c) | ....do.... | 75 | 195 | 0.05 | 97 |
| (d) | Internal Filter (2-micron) | >600 | >1,500 | 0.05 | 97 |

NOTES

Reaction conditions:
400 p.s.i.g., Raney No. 28 nickel catalyst, 25% DNT–75% MeOH feed.
Residence Time, one hour, 120° C.
XII (a) 5% catalyst charge (5 lb. catalyst/sq.ft. filter), catalyst loading=0.028; catalyst loading of 0.014 used the first two days 0.022 used the 3rd day; and 0.028 from then on.
XII (b) Same as (a) but full catalyst loading (0.028) from the beginning.
XII (c) Same as (a) but 10% catalyst charge (10 lb. catalyst/sq.ft. filter).
XII (d) Same as (c) but with 15 lb. catalyst per sq. ft. of filter area, using a 2-micron filter size.
*Ultimate yield.

Various modifications of the invention, some of which have been referred to above, may be employed, without departing from the spirit of this invention.

What is desired to be secured by Letters Patent is:

1. In the continuous process for the catalytic hydrogenation of an aromatic polynitro compound in the liquid phase in the presence of a nickel catalyst to yield the corresponding aromatic polyamine, wherein said aromatic polynitro compound and hydrogen are continuously fed to a reaction zone containing an agitated slurry of nickel catalyst, the improvement which comprises simultaneously and continuously
   (a) maintaining the reaction zone saturated with hydrogen,
   (b) feeding said aromatic polynitro compound to the liquid phase at a rate equivalent to a catalyst loading of no more than about 0.15 pound-equivalents of nitro groups per hour per pound of catalyst in the reaction zone,
   (c) maintaining the concentration of said aromatic polynitro compound in the reaction zone below about 0.1 percent by weight,
   (d) and continuously withdrawing from the reaction zone the liquid phase of said slurry while retaining said catalyst in the reaction zone.

2. The process of claim 1 wherein said aromatic polynitro compound is added to the reaction zone at a rate equivalent to between about 0.01 and about 0.11 pound-equivalents of nitro groups per hour per pound of catalyst in the reaction zone.

3. The process of claim 1 wherein said aromatic polynitro compound is fed to said reaction zone dissolved in an inert solvent for said aromatic polynitro compound.

4. The process of claim 1 wherein said aromatic polynitro compound is dinitrotoluene.

5. The process of claim 1 wherein said aromatic polynitro compound is trinitrotoluene.

6. The process of claim 1 wherein said aromatic polynitro compound is dinitrotoluene and said inert solvent is methanol.

7. In the continuous process for the catalytic hydrogenation of an aromatic polynitro compound in the liquid phase in the presence of a nickel catalyst to yield the corresponding aromatic polyamine, wherein hydrogen and a solution of an aromatic polynitro compound in an inert solvent therefor are continuously fed to a reaction zone containing an agitated catalyst slurry, the improvement which comprises simultaneously and continuously
   (a) maintaining the reaction zone saturated with hydrogen,
   (b) maintaining the reaction zone under a pressure of between about 100 and about 2000 p.s.i.g,
   (c) maintaining the temperature of the reaction zone within the range between about 85° and 150° C.,
   (d) feeding said aromatic polynitro compound to the reaction zone at a rate equivalent to a catalyst loading of no more than about 0.15 pound-equivalents of nitro groups per hour per pound of catalyst,
   (e) maintaining the concentration of said aromatic polynitro compound in the reaction zone below about 0.1 percent by weight,
   (f) and continuously withdrawing from the reaction zone the liquid phase of said slurry while retaining said catalyst in the reactor zone.

8. The process of claim 7 wherein said aromatic polynitro compound is dinitrotoluene.

9. The process of claim 7 wherein said aromatic polynitro compound is trinitrotoluene.

10. In the continuous process for the catalytic hydrogenation of an aromatic polynitro compound in the liquid phase in the presence of a nickel catalyst to yield the corresponding aromatic polyamine, wherein said aromatic polynitro compound and hydrogen are continuously fed to a reaction zone containing an agitated slurry of nickel catalyst, the improvement which comprises simultaneously and continuously
   (a) maintaining the reaction zone saturated with hydrogen,
   (b) feeding said aromatic polynitro compound to the liquid phase at a rate equivalent to a catalyst loading of no more than about 0.15 pound-equivalents of nitro groups per hour per pound of catalyst in the reaction zone,
   (c) and maintaining the concentration of said aromatic polynitro compound in the reaction zone below about 0.1 percent by weight.

11. The process of claim 10 in which said aromatic polynitro compound is dinitrotoluene, and said dinitrotoluene is fed to said liquid phase as a methanol solution containing between about 15 and about 35 percent by weight of dinitrotoluene.

References Cited

UNITED STATES PATENTS

| 2,164,154 | 6/1939 | Henke et al. | 260—580 |
| 2,388,608 | 11/1945 | Emerson | 260—580 |
| 2,458,214 | 1/1949 | Souders | 260—580 |

CHARLES B. PARKER, *Primary Examiner.*

N. WICZER, P. C. IVES, *Assistant Examiners.*